United States Patent
Cheng

(10) Patent No.: US 7,882,699 B2
(45) Date of Patent: Feb. 8, 2011

(54) ENVIRONMENT-CONSERVATIVE FUEL ECONOMIZER

(76) Inventor: Chun-Hua Cheng, No. 13, Lane 135, Sec. 2, Mincyuan East Road, Taipei City (TW)

( * ) Notice: Subject to any disclaimer, the term of this patent is extended or adjusted under 35 U.S.C. 154(b) by 643 days.

(21) Appl. No.: 11/896,931

(22) Filed: Sep. 6, 2007

(65) Prior Publication Data

US 2009/0064671 A1   Mar. 12, 2009

(51) Int. Cl.
*F01N 3/02* (2006.01)
(52) U.S. Cl. ............... 60/317; 60/272; 60/318; 60/323; 60/324
(58) Field of Classification Search ........... 60/272, 60/317, 318, 319, 322, 323, 324, 299, 308
See application file for complete search history.

(56) References Cited

U.S. PATENT DOCUMENTS

| | | | | |
|---|---|---|---|---|
| 4,331,213 A | * | 5/1982 | Taniguchi | 181/263 |
| 5,174,113 A | * | 12/1992 | Deville | 60/309 |
| 5,927,759 A | * | 7/1999 | Hyslop | 285/9.1 |
| 7,470,301 B2 | * | 12/2008 | Heydens | 55/523 |
| 2008/0087006 A1 | * | 4/2008 | Wu et al. | 60/280 |
| 2010/0000205 A1 | * | 1/2010 | Freese | 60/320 |

* cited by examiner

*Primary Examiner*—Binh Q Tran

(57) ABSTRACT

An environment-conservative fuel economizer includes a hollow tubular member and at least one ring member. The tubular member has an internal surface forming a reduced neck section. The ring member is mounted to an end of the tubular member. The ring member forms a plurality of cut-off slits, which defines a plurality of deformable leaves. The neck section of the tubular member forms a flow-accelerating passage, which increases speed of air flow passing therethrough to induce secondary combustion. The leaves are allowed to selectively expand/contract to effect complete combustion and reduce pollution. The fuel economizer is installed between an automobile air filter and engine air-intake tube to use the suction force induce by air intake of cylinder to draw in air so that the mixture density of air and atomized fuel is intensified to effect complete combustion of fuel and enhance instantaneously engine torque and reduce fuel consumption.

3 Claims, 5 Drawing Sheets

ENVIRONMENT-CONSERVATIVE FUEL ECONOMIZER

BACKGROUND OF THE INVENTION

1. Field of the Invention

The present invention relates to an environment-conservative fuel economizer, wherein an internal circumference of a tubular member forms a reduced neck section and a ring member forms a plurality of cut-off slits that defines a plurality of leaves to thereby enhance the speed of air flow passing therethrough to induce secondary combustion and reduce pollution to the environment, and the present invention is applicable to all kinds of gasoline vehicles, diesel vehicles, or the likes.

2. The Related Arts

Automobiles are a convenient transportation to the modern people. The automobile has an engine that uses a mixture of atomized fuel and intake air, which is put into combustion by being ignited by a spark plug, to drive the operation of the engine. Thus, the amount of intake air, intake pressure, and the smoothness of air intake are all factors that affect the ratio of air-fuel mixture. In case that the intake speed of the air is excessively low or the air flow of the intake air is not fluent, the engine horsepower may be substantially reduced and extra fuel is consumed. In case that the air intake is not uniform, incomplete explosion or combustion may be resulted, leading the generation of exhaust gas.

A brand new car does not suffer insufficiency of air intake. However, the automobile manufacturers set all the cars with the same initial settings, which may also lead to insufficient air intake and thus incomplete combustion because different drivers operate the automobile engines in different styles. Further, after a long period of operation of the automobile, the air filter may get clogged, which leads to insufficient air intake and thus reduces the output power of the engine. This results in delayed response, over-consumption of fuel, impotence of quick raise of torque and eventually prevents the engine from providing the rating horsepower.

In view of these drawbacks, the present invention is aimed to provide an environment-conservative fuel economizer that improves environment pollution caused by automobile exhaust gas and realizes complete combustion of fuel and eliminates deposition of carbon.

SUMMARY OF THE INVENTION

Thus, an objective of the present invention is to provide an environment-conservative fuel economizer comprising a tubular member having an end to which a ring member is mounted, and the ring member forms a plurality of cut-off slits to define a plurality of leaves, which increases the output torque and increases the speed of air flowing therethrough to induce secondary combustion so that the exhaust gas is no longer dangerous to human body and environment pollution can be improved.

Another objective of the present invention is to provide an environment-conservative fuel economizer comprising a tubular member having an internal circumference forming a reduced neck section to serve as a Venturi tube for increasing flow speed of air therethrough and inducing a low pressure to generate a suction force for intensifying the mixture density of air and atomized fuel and as a consequence, complete combustion can be realized and deposition of carbon can be prevented.

To achieve the above objectives, in accordance with the present invention, there is provided an environment-conservative fuel economizer, comprising a hollow tubular member and at least one ring member. The tubular member has an internal surface forming a reduced neck section. The ring member is mounted to an end of the tubular member. The ring member forms a plurality of cut-off slits, which defines a plurality of deformable leaves. The neck section of the tubular member forms a flow-accelerating passage, which increases speed of air flow passing therethrough to induce secondary combustion. The leaves are allowed to selectively expand/contract to effect complete combustion and reduce pollution. The fuel economizer is installed between an automobile air filter and engine air-intake tube to use the suction force induce by air intake of cylinder to draw in air so that the mixture density of air and atomized fuel is intensified to effect complete combustion of fuel and enhance instantaneously engine torque and reduce fuel consumption.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
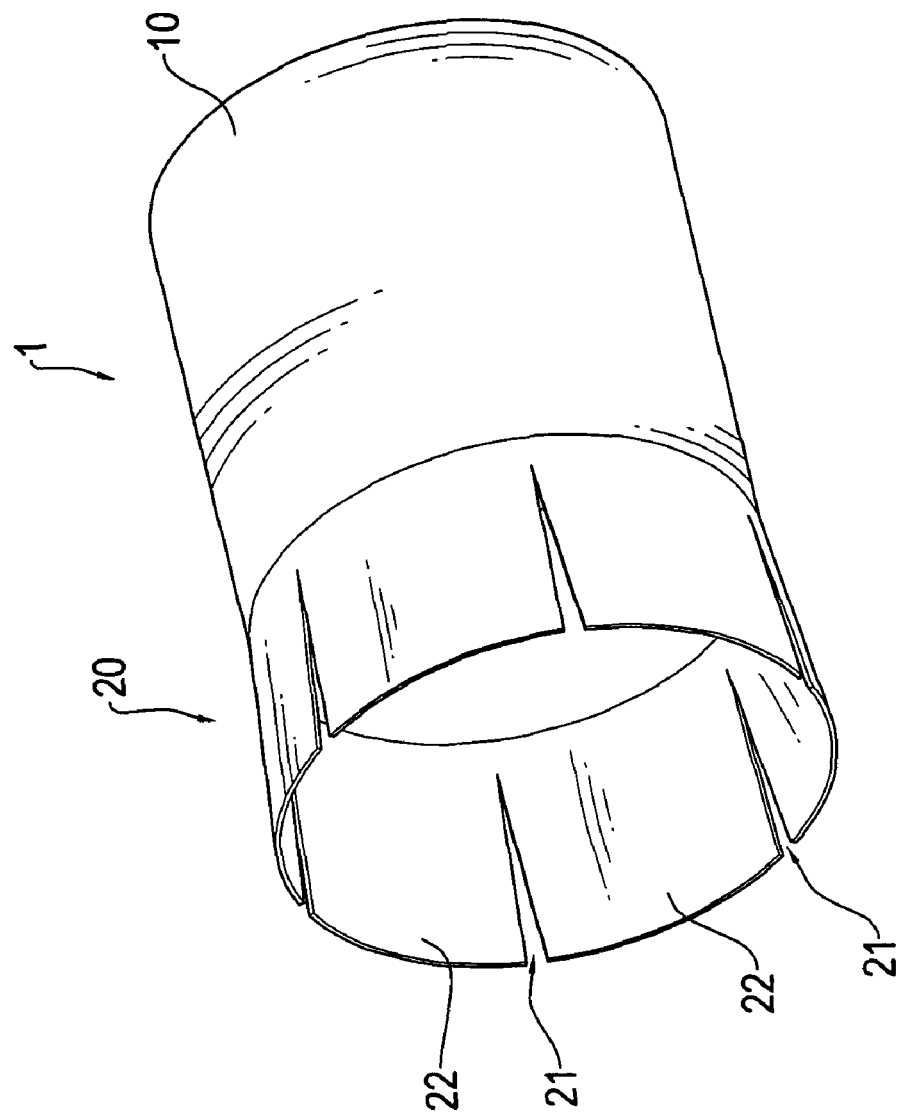
FIG. 1 is a perspective view of an environment-conservative fuel economizer constructed in accordance with an embodiment of the present invention.
Figure 2:
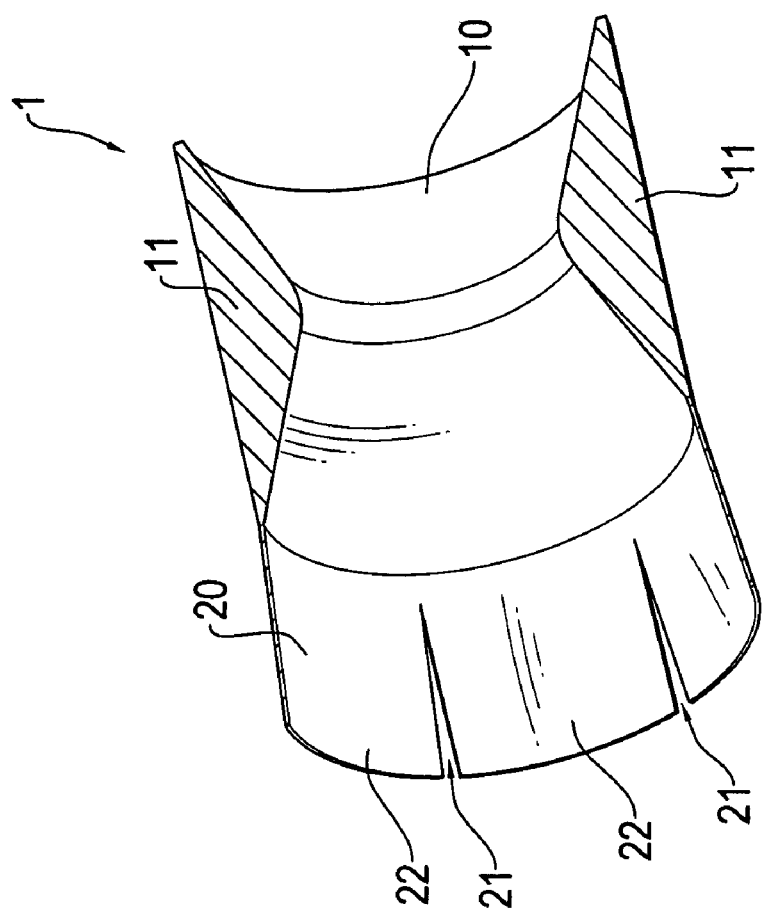
FIG. 2 is a cross-sectional view of the environment-conservative fuel economizer of the present invention.
Figure 3:
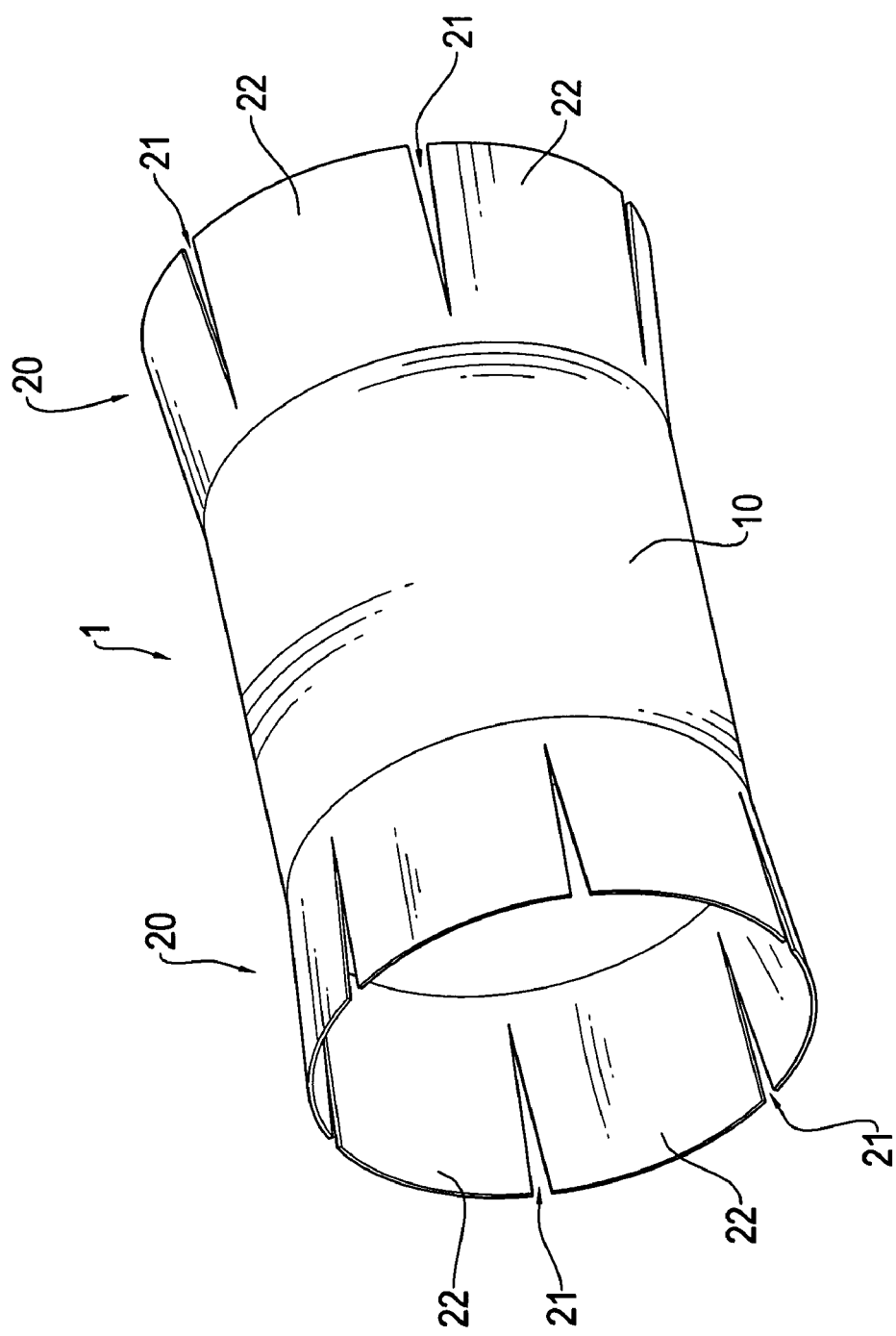
FIG. 3 is a perspective view of an environment-conservative fuel economizer constructed in accordance with another embodiment of the present invention.

With reference to the drawings and in particular to FIGS. 1-3, an environment-conservative fuel economizer constructed in accordance with the present invention, generally designated with reference numeral 1, comprises a tubular member 10 and a ring member 20. The tubular member 10 is a hollow member having an interior delimited by an internal circumferential surface, which forms a converged neck section 11 having reduced inside diameter. The ring member 20 is attached to an end of the tubular member 10, or if desired and preferably, the ring member 20 may be attached to each of two ends of the tubular member 10. The ring member 20 is of a flaring configuration in which a plurality of circumferentially-spaced and axially-extending slits 21 is defined to form a plurality of resilient leaves 22. The ring member 20 and the tubular member 10 can be integrally formed as a unitary device, or the ring member 20 can be mounted to the tubular member 10 by means of any known means, such as welding. With such a configuration, the neck section 11 of the tubular member 10 constitutes a diameter-reduced airflow passage, which accelerates the air passing therethrough and inducing secondary combustion and further, the leaves 22 can be caused to expand or contract to realize complete combustion of the fuel and thus reduce environmental pollution.

Figure 4:
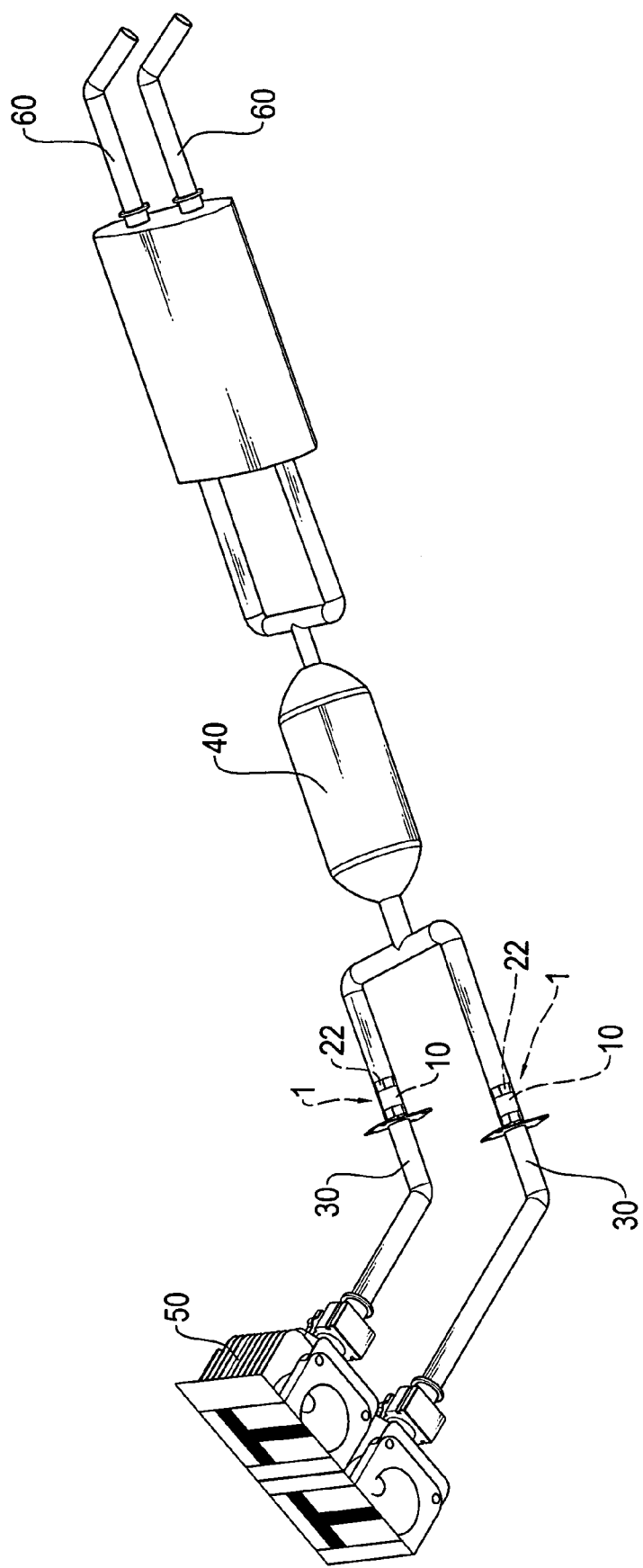
FIG. 4 is a schematic perspective view illustrating an application of the environment-conservative fuel economizer of the present invention in an automobile exhaust pipe.
Figure 5:
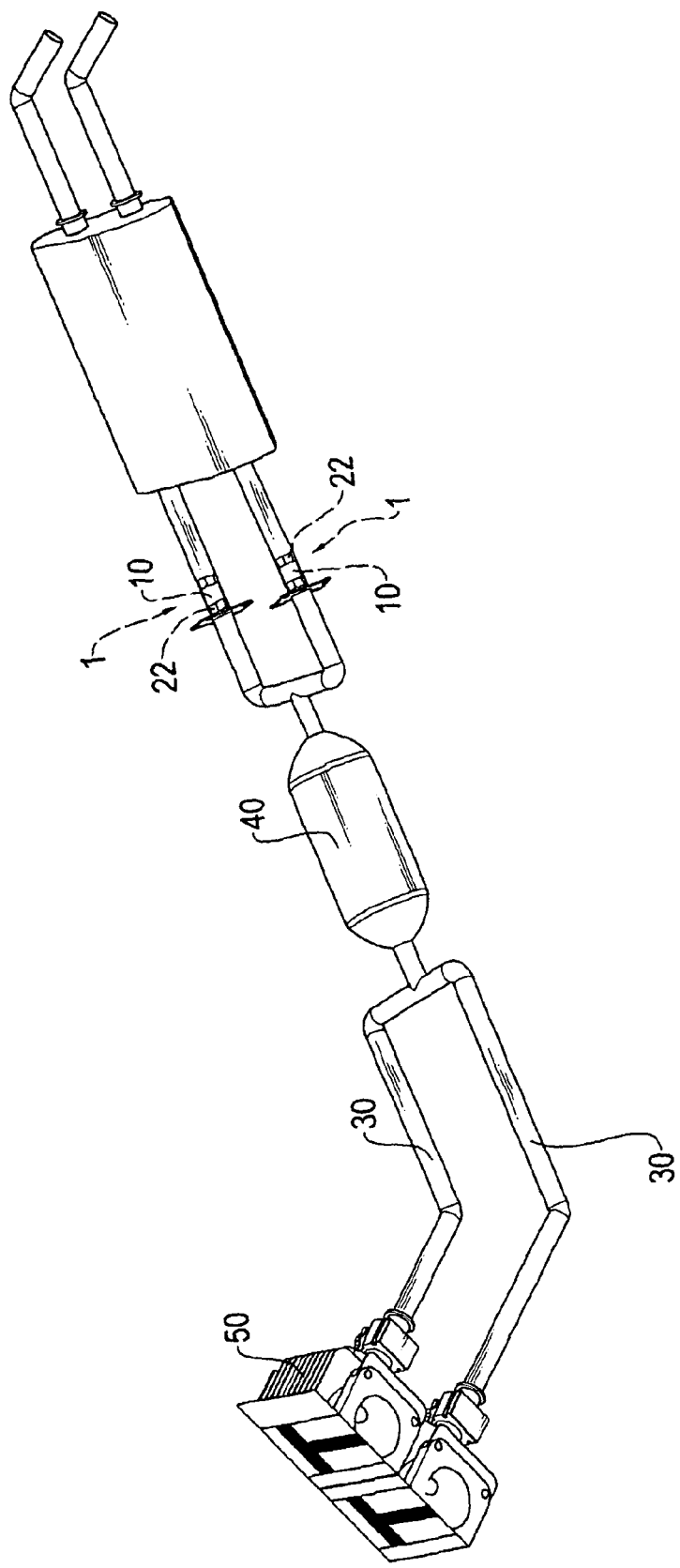
FIG. 5 is a schematic perspective view illustrating another application of the environment-conservative fuel economizer of the present invention in an automobile exhaust pipe.

Also referring to FIGS. 4 and 5, in use, the environment-conservative fuel economizer 1 is mounted to an exhaust pipe 30 and can be arranged either upstream of a catalytic air purifier 40 or downstream of the catalytic air purifier 40. The exhaust pipe 30 is connected to an engine 50 whereby suction forced induced by the opening/closing of a throttle valve of engine cylinders causes air to flow through the environment-conservative fuel economizer 1 before or after the air passes through the catalytic air purifier 40. Due to the effect of Venturi tube inside the tubular member 10, the flow speed of air is increased and pressure of the air drops, which induces a suction force that intensifies the mixture density of air and atomized fuel to realize completely combustion with no carbon deposition, and enhance instantaneous explosion power, increase speed, generate great torque, and achieve saving of fuel. The catalytic air purifier 40 can process three major pollutants contained in exhaust gas of the engine 50, which are nitrogen oxide ($NO_x$), carbon monoxide (CO), and incompletely combusted fuel vapor or hydrocarbons (HC), and thus the catalytic air purifier 40 is commonly referred to as three-way catalytic converter, which allows an automobile to satisfy the current severe regulations for exhaust gases and to reduce pollution to the atmosphere. The catalytic air purifier 40 contains several kinds of rare noble metals, serving as the catalysts, which are of expensive costs. The catalysts function to increase the speed of chemical reaction, but generally are not consumed themselves.

For an ordinary automobile, the fuel consumption is of the greatest value at the time when the automobile is about to move from a standstill condition. This is because the acceleration pedal is stepped and the amount of atomizer fuel driven into the engine 50 is excessive as compared to the amount of intake air. Due to the insufficiency of air, sufficient mixture with the fuel cannot be achieved, leading waste of fuel and also reducing the output torque and horsepower. On the other hand, an automobile equipped with the fuel economizer 1 in accordance with the present invention begins to move with a low speed, atomized fuel is caused to enter the engine 50, which also causes air to get into the engine. The fuel economizer 1 functions to cause the external air to be fast drawn into the engine 50 thereby instantaneously and substantially increasing the output torque and horsepower of the automobile, leading to excellent instantaneous explosion power at the low speed.

In order to overcome the problem that when the engine is in idle speed and temperature valve is closed due to low temperature, the cylinder throttle valve is set in wide open condition and the variable valve timing system is stopped from leading air in and the manifold does not reach exhaust gas recirculation (EGR) control valve, making the EGR in inactive condition. However, when the EGR is abnormal, with the air fuel ratio set in a range other than 15-16, in case the automobile is idle or in large-load operation, the operation of the EGR may make the engine in poor operation or making the automobile immobile. With the fuel economizer 1 in accordance with the present invention, the lowest emission of carbon monoxide (CO) and hydrocarbons (HC) can be improved and the nitrogen oxides flowing therethrough can take secondary combustion. This allows the engine 50 to further drawn in fresh air in a negative pressure at the rock position of the cylinders and additional explosion occurs in the engine 50 to generate an additional 15% or so torque and the nitrogen oxide at the rock position can be completely expelled. This, together with the leaves 22 of the ring member 20 of the fuel economizer of the present invention that can selectively converge or diverge to expand or contract, effectively converts the odor-smelled exhaust gas into odorless gas and minimizes the amount of emission of carbon monoxide, whereby the automobile exhaust gas is no longer harmful to human body and the quality of environmental protection can be enhanced.

When air flows through the environment-conservative fuel economizer 1, the internal neck section 11 of the tubular member 10, as shown in FIG. 2, functions to increase the flow speed and the air flow, with a high speed entering the engine 50, can reduce potential damages to the engine 50. The ring member 20 is provided with a plurality of cut-off slits 21 to define a plurality of leaves 22, which can selectively expand or contract, or intersect air stream in response to the opening/closing of engine throttle valve in order to realize performance enhancement and fuel saving in both low, middle, and high speeds.

Further, the environment-conservative fuel economizer 1 in accordance with the present invention can be installed in a tail section 60 of the automobile exhaust pipe 30, such an arrangement being not illustrated in the drawings but easily anticipated by those having ordinary skills. When the exhaust gas after combustion-inside the engine 50 is discharged through the tail section 60 of the exhaust pipe 30, due to the environment-conservative economizer 1 mounted to the tail section 60 of the exhaust pipe 30, carbon deposition inside the exhaust pipe 30 can be eliminated and the discharge of the exhaust gas can be made smooth.

To this point, it is apparent that the present invention has at least the following advantages:

The environment-conservative fuel economizer of the present invention comprises a ring member mounted to an end of a tubular member that forms a Venturi tube and the ring member is provided with a plurality of cut-off slits that defines a plurality of leaves of the ring member whereby air flow can be accelerated to pass therethrough and secondary combustion can be realized to enhance mixture of fuel and air, leading to intensified mixture density of air and atomized fuel, which results in complete combustion of air-fuel mixture with no residual fuel and no carbon deposition, as well as eliminating air pollution to realize environmental protection.

The environment-conservative fuel economizer allows the air entering the engine to generate high torque so that the consumption of fuel can be reduced and the sufficient supply of air allows the air-fuel mixture to be denser, leading to enhancement of engine horsepower and save of fuel.

The environment-conservative fuel economizer can be easily installed without substantial damage to the original design and construction of air intake manifold and removal or dismounting of original parts of an automobile.

The environment-conservative fuel economizer is provided movable leaves, which operate in response to the opening/closing of the engine throttle at low, middle, and high speeds so that the leaves can selectively expand or contract to adjust the air flowrate and thus inducing instantaneous increase of engine torque.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An environment-conservative fuel economizer, comprising:
    a hollow tubular member having an internal surface forming a reduced neck section; and
    two ring members respectively mounted to opposite ends of the tubular member, each said ring member forming a plurality of cut-off slits, which defines a plurality of deformable leaves; wherein the neck section of the tubular member forms a flow-accelerating passage, which increases speed of air flow passing therethrough to induce secondary combustion, and wherein the leaves are allowed to selectively expand/contract to effect complete combustion and reduce pollution.

2. The environment-conservative fuel economizer as claimed in claim 1, wherein the tubular member and the two ring members are integrally formed as a unitary device.

3. The environment-conservative fuel economizer as claimed in claim 1, wherein each said ring member is mounted to each end of the tubular member by welding.

* * * * *